March 20, 1928.  A. CRUICKSHANKS  1,662,884
SECTIONAL POLE
Filed June 18, 1923
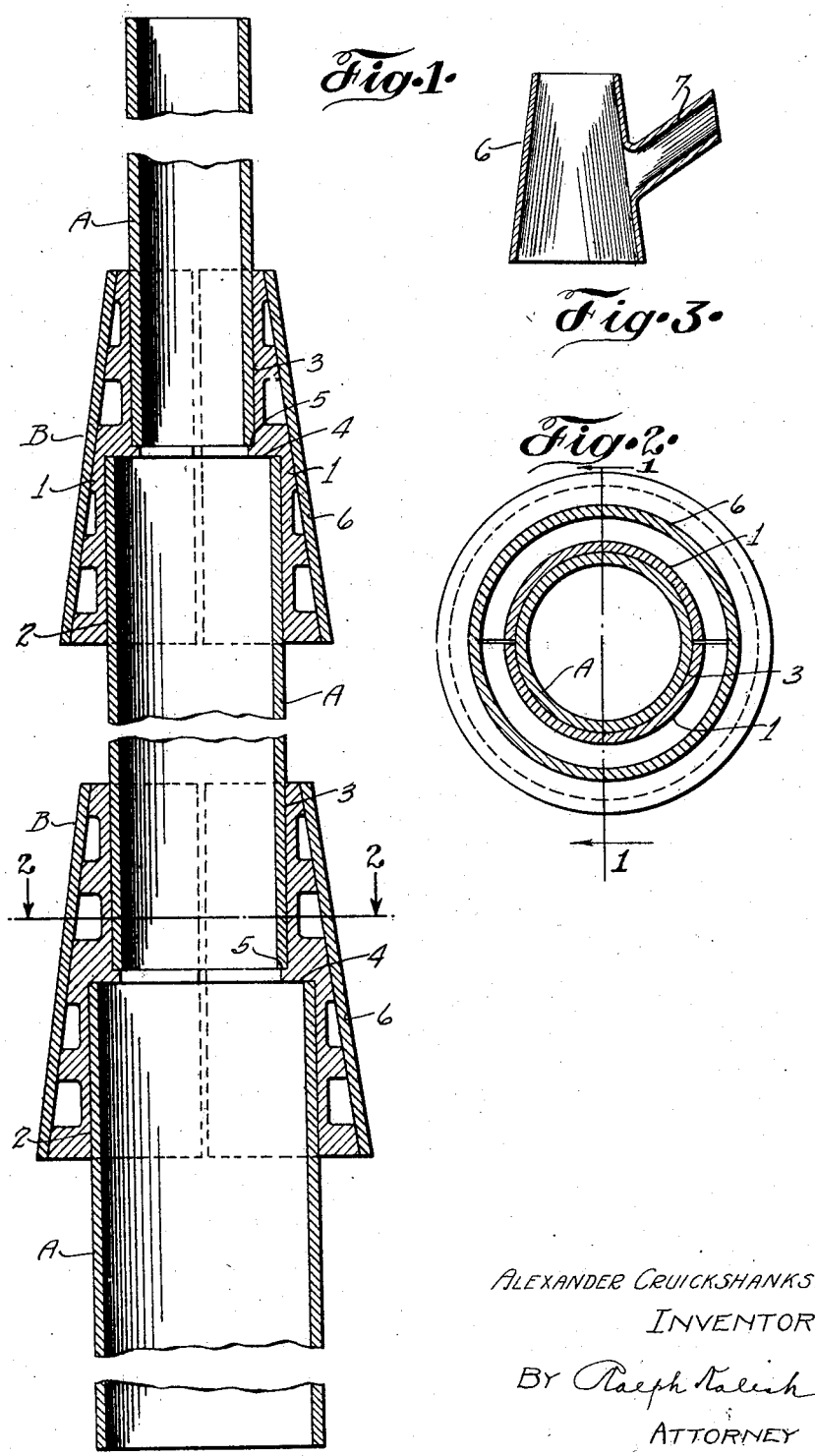
ALEXANDER CRUICKSHANKS.
INVENTOR
BY Ralph Kalish
ATTORNEY Patented Mar. 20, 1928.

1,662,884

UNITED STATES PATENT OFFICE.

ALEXANDER CRUICKSHANKS, OF ST. LOUIS, MISSOURI.

SECTIONAL POLE.

Application filed June 18, 1923. Serial No. 646,158.

This invention relates to a certain new and useful improvement in pipe-couplings and has for its chief object the provision of a coupling of simple, inexpensive, and compact form and construction which is especially adapted for the endwise connection with convenience, rigidity, and efficiency of tubular or pipe-sections in the formation or building up of more or less elongated supports for flagstaffs, radio aerials, lightning arresters, or other poles of gradually tapering diameter.

With the above and other objects in view, my invention resides in the novel features of form, construction, arrangement, and combination of parts hereinafter described and afterwards pointed out in the claim:

In the accompanying drawing,

Figure 1 is a vertical sectional view of a built-up pole or staff-support constructed in accordance with, and embodying coupling or connection-members of, my invention;

Figure 2 is a cross-sectional view taken approximately on the line 2—2, Figure 1; and Figure 3 is a vertical sectional view of a slightly modified form of the bushing or split collar retaining-sleeve of one of the coupling-members.

Referring now more in detail and by reference characters to the drawing, my new pole-support is made up of a plurality of tubular or pipe sections A of gradually decreasing diameter connected or coupled together in endwise relation by coupling or connection members B.

Each of the coupling-members B includes a tubular bushing of split-collar type, that is to say, each bushing comprises a pair of separate co-operating sections 1—1 together having a smooth bore at one end, as at 2, of a diameter to snugly fit the one or upper end of one of the pipe-sections A and a smooth bore at their other end, as at 3, of relatively reduced diameter to similarly snugly fit the one or lower end of the next or contiguous pipe-section A. Such counterboring of the bushing provides an intermediate internal shoulder, as at 4, where the bushing sections 1 are together formed with an annular inwardly projecting seat or flange 5, all for purposes shortly appearing and as clearly seen in Figure 1.

Each coupling-member B, including its tubular bushing, is in elevation of conical or truncated cone shape or form, and forming part of the coupling-member and adapted to tightly surround and embrace the bushing sections 1—1 to efficiently retain the same together in complete collar-form, is a similarly conical or tapering sleeve 6.

In practice, a coupling bushing is fitted at its bore 2 and shoulder 4 to rest upon and snugly embrace the upper end of a lower pipe-section A, and a sleeve 6 then slidably fitted in engagement upon the bushing to rigidly retain its sections 1—1 co-operatively in such pipe-embracing relation. A second pipe-section A of lesser or reduced diameter relatively to the next lower pipe section A and of an outer diameter corresponding to the bore 3 of the bushing, is then snugly fitted at its lower end within the bushing bore 3 and rested at its lower end upon the bushing-seat 5, the shoulder 4 and seat 5 of the coupling functioning to prevent endwise collapsing of the several sections A.

In such manner, a pole or staff-support of special or ordinary piping may be built-up to any length or height desired, the connection members B rigidly and efficiently coupling the several pipe-lengths or sections endwise together in staff formation.

My new coupling members are particularly useful in the erection of supports for flagstaffs, radio aerials, and especially poles of gradually decreasing diameter; and as illustrated in Figure 3, one or more of the bushing or collar retaining-sleeves may be integrally or otherwise formed or provided angularly with a tubular projection 7 to accommodate a branch-pole, wire, or the like.

I am aware that minor changes in the form, construction, arrangement, and combination of the several parts of my new pipe-coupling may be made and substituted for those herein shown and described without departing from the nature and principle of my invention.

Having thus described my invention, what I claim and desire to secure by Letters Patent is:

A coupling for the hollow sections of a sectional pole the diameter of said sections increasing from top to bottom, comprising a bushing having oppositely-directed bores of different diameters to accommodate sections of different diameter, the bushing being composed of a plurality of externally-tapered parts divided along longitudinal lines and having internal shoulders separating said bores and supporting the upper section of the sections coupled thereby, and an internally tapered sleeve adapted to force said parts into clamping relation with the sections connected thereby.

In testimony whereof, I have signed my name to this specification.

ALEXANDER CRUICKSHANKS.